April 1, 1952 P. H. SANBORN 2,590,893
INSULATOR
Filed Sept. 20, 1949
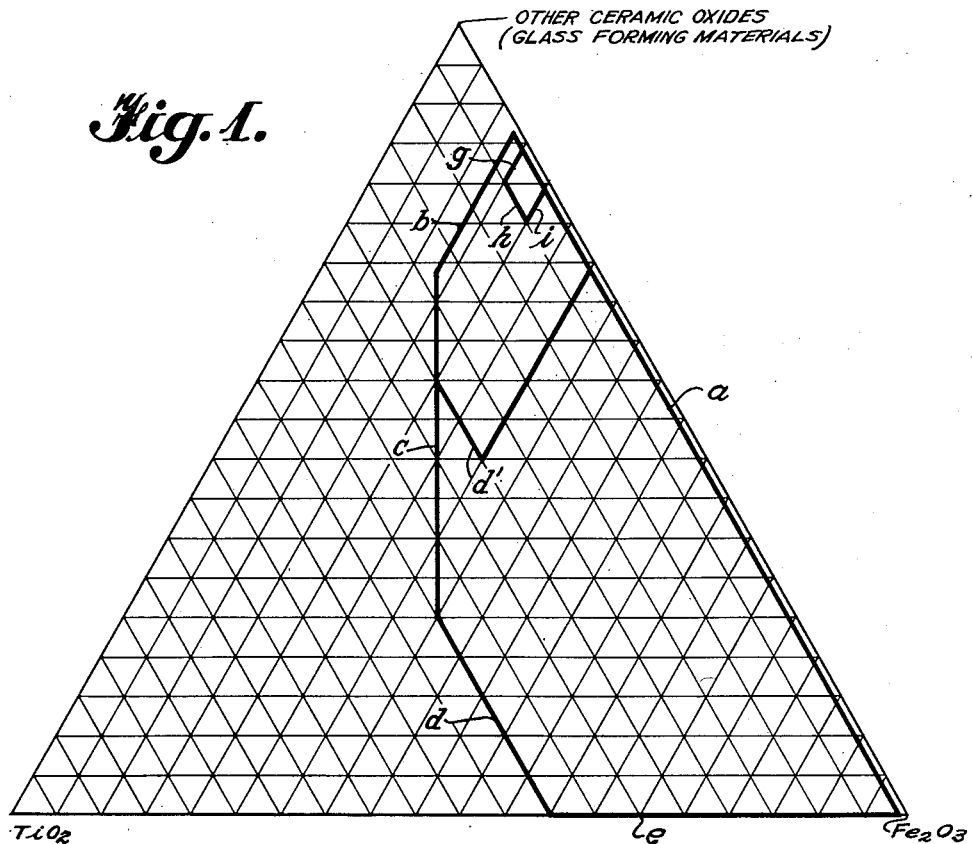
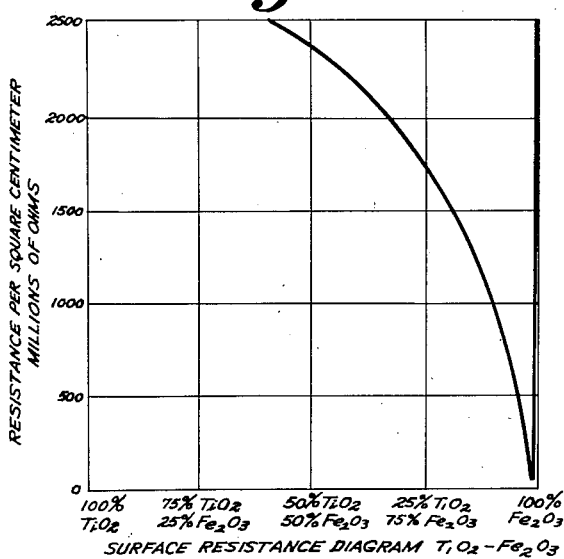
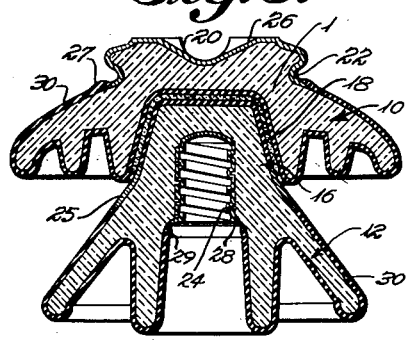
INVENTOR
Paul H. Sanborn
By Bacon & Thomas
ATTORNEYS Patented Apr. 1, 1952

2,590,893

UNITED STATES PATENT OFFICE 2,590,893

INSULATOR

Paul H. Sanborn, Parkersburg, W. Va.

Application September 20, 1949, Serial No. 116,671

13 Claims. (Cl. 252—490)

This invention relates to insulators, and more particularly, to insulating bodies provided with a fired ceramic conducting coating or glaze containing ferric oxide and titanium dioxide and having electrical conducting properties.

Electrical conducting materials which are essentially fired ceramic products and which have high negative temperature coefficients of resistance and are capable of being employed in a wide variety of applications for which ordinary resistance or conducting materials are not adapted have been disclosed in my copending application, Serial No. 116,672, filed of even date herewith. Similar compositions may be applied as conducting coatings or glazes to portions of porcelain insulators employed on high voltage alternating current transmission lines to suppress radio interference. Such glaze, when positioned upon an insulator so as to contact the conductor and, preferably also the supporting member of the insulator, reduces the discharges causing radio interference. A conducting coating glaze in accordance with the present invention may be glass-like and have mechanical properties, surface gloss and moisture imperviousness equal to insulating glazes conventionally employed on porcelain insulators. Such glazes will ordinarily contain a relatively large proportion of glass-forming ingredients in addition to titanium dioxide and ferric oxide although for certain purposes where mechanical strength is not important, mixtures of substantially pure ferric oxide and titanium dioxide or mixtures of the latter two oxides with other ceramic materials not producing glass-like coatings may be employed.

It is known that a number of metal oxides have conducting properties which vary according to the degree of oxidation or oxygen content. In general, the lower the degree of oxidation, the greater the conductivity. At the higher states of oxidation, for example, states of oxidation approaching those corresponding to ferric oxide or titanium dioxide, conduction is negligible. It is with the greatest difficulty that uniform conducting materials can be produced utilizing oxides in lower states of oxidation such that their conductivity is determined by their oxygen content. Such oxides are usually molded and heated to produce a dense mass. The degree of oxidation is determined by the oven or furnace atmosphere surrounding the oxides. The atmosphere during firing must be reducing or oxidizing to the exact degree required to produce the specific resistivity desired. Slight variations produce great changes in specific resistivity. In addition to the difficulty in maintaining the proper furnace atmosphere, the firing temperature and the time of heating also produce variable results. As the temperature is increased, the mass becomes more dense so that the furnace gases can no longer penetrate it and the reactions occur at the exposed surfaces. The final products do not exhibit stable electrical characteristics because their oxygen content is not that which exists at the most stable state of the oxides and during operation in electrical circuits, there is a trend toward higher values of resistance, particularly if the current is sufficient to produce appreciable heating. Furthermore, most oxides produce rather high values of specific resistivity.

It is known that either ferric oxide or titanium dioxide alone, when heated under conditions in which oxygen is present during the entire heating period, produce materials of very high resistivity, i. e., negligible conductivity. In accordance with the present invention, it has been discovered that, if these two oxides are mixed in proper proportions and fired in an oxidizing atmosphere, materials are produced which have conductivities which are millions of times greater than the conductivities of either of these oxides fired alone under the same conditions. The oxidizing atmosphere is that prevailing in commercial ceramic kilns in which free oxygen in excess of that necessary for the combustion of the fuel is present.

It has been determined from an investigation of the ferric oxide-titanium dioxide system that the composition 2.5% titanium dioxide and 97.5% ferric oxide produces the lowest resistivity of any combination of these oxides. A specific resistivity of 1.5 ohm centimeters has been obtained with this composition prepared by pressing in steel dies and firing to 2300° F. on a 72 hour total cycle, whereas a 100% chemically pure ferric oxide composition or a 100% chemically pure titanium dioxide composition prepared in the same manner has a specific resistivity of millions of megohms. Within the range between 100% ferric oxide and 97.5% ferric oxide and 2.5% titanium dioxide there is an extremely rapid decrease in specific resistivity. There is tremendous reduction in resistivity between 100% ferric oxide and the composition 99.5% ferric oxide and 0.5% titanium dioxide. As the titanium dioxide is increased above 2.5% the specific resistivity increases slowly then rapidly until the specific resistivity of the composition 97.5% titanium dioxide 2.5% ferric oxide is $10^{14}$ ohms per cubic centimeter.

To explain the formation of semi-conductors of low specific resistivity from two oxides which normally have extremely high specific resistivity it is advisable to consider the atomic structure and the behavior of electrons in accordance with the modern theory of solids. Atoms of solids are bound together and form a crystal lattice. Each atom nucleus is surrounded by a number of electrons which have definite paths and energies. Some electrons are bound and revolve around the nucleus. Other electrons are free and may jump from atom to atom. Metals or conductors, semiconductors and insulators have energy states which are grouped into bands. The energy bands are derived from the atomic energy levels of free atoms. Each band consists of a large number of closely spaced energy levels. There is a single free electron in each level of a band. The allowed bands filled and empty are separated by ranges of energy containing no levels and are known as forbidden bands because they are not permitted to electrons. If the forbidden band is wide, the band structure is that of an insulator. If, however, this band is small and the gap in energy between the highest filled band and the lowest empty band is of the order of fractional electron volts, the material is a semi-conductor. Filled and empty bands separated by small forbidden regions is the band structure of an intrinsic semi-conductor. Conduction in intrinsic seim-conductors is by excited electrons jumping into the empty band.

Extrinsic semi-conductors have band structures similar to that of insulators except that the forbidden region contains extra energy levels as the result of lattice imperfections or the presence of impurities. These extra energy levels in the forbidden region act either as donators or acceptors. At finite temperatures the donator level may pass on its electron to the empty band and in the process causes conduction. Similarly, an acceptor may accept an electron from the filled band. The loss of the electron leaves an empty level in the formerly filled band. Conductivity may result from a few electrons in a normally empty band or a few vacancies in a normally filled band. It is convenient to consider the vacant levels as holes in a nearly full band. These holes act as positive charged electrons.

Most extrinsic semi-conductors become intrinsic semi-conductors at elevated temperatures. Heat excites the electrons in intrinsic conduction. Extrinsic semi-conductors are most useful because they can be produced with low resistance at ordinary temperatures. Extrinsic semi-conductors are of two types:

(1) "N" type semi-conductors which conduct principally by electrons in a nearly empty band.

(2) "P" type semi-conductors which conduct principally by holes in a nearly filled band.

The introduction of extra discrete energy levels in the forbidden region account for the conductivity and determine the type of semi-conductor, whether "N" or "P" type. The titanium dioxide-ferric oxide semi-conductor contains titanium dioxide as the impurity. It is the titanium dioxide which causes the distortion of the ferric oxide lattice and produces changes in the inherent physical structure and the electrical and mechanical forces. The distortion produces the levels between the filled and empty bands.

"N" type semi-conductors have characteristics which differ from those of the "P" type. If a metal connection is made to each end of a rod of the semi-conductor material to produce a thermocouple and if one junction is heated, the polarity of the junctions is characteristic of the type of semi-conductor. If the lead from the hot junction is positive and the lead from the cold junction is negative, the semi-conductor is of the "N" type. Should the hot junction be negative and the cold junction be positive, the semi-conductor is of the "P" type.

A ferric oxide-titanium dioxide semi-conductor as an element of a thermocouple with copper, platinum, gold or other metal as the metallic element has positive polarity at the hot junction and therefore exhibits the characteristics of an "N" type semi-conductor.

The point contact rectification properties of a semi-conductor are also an indication of the type of semi-conductor. If the current flow is greater when the cat whisker or point contact is positive than when negative, the semi-conductor is of the "N" type. If greater current flows when the point contact is negative, the semi-conductor is of the "P" type.

As a point contact rectifier with a ferric oxide-titanium dioxide semi-conductor, the greatest current flow is with the point contact made positive. The ferric-oxide-titanium dioxide semi-conductor, therefore, is of the "N" type.

Since the conductivity of a semi-conductor is the result of the introduction of extra energy levels in the forbidden zone as the result of lattice imperfections, impurities or the effect of the impurities in producing lattice imperfections, X-ray diffraction patterns were made of the ferric oxide-titanium dioxide semi-conductor materials and of pure ferric oxide to observe the changes. Finely ground crystal powder produces a diffraction pattern of sharp lines, the position and intensity of which are completely characteristic for each pure single compound. When a crystalline substance is exposed to a fine beam of monochromatic X-radiation, a series of secondary reflected beams emerge which have definite spacings and intensities depending upon the atomic structure of the substance irradiated. These beams are recorded on a photographic film. The X-ray reflections from crystalline planes are critical and emerge at specific angles only. The reason for this is that the crystal is an orderly arrangement of particles in a three dimensional lattice. The actual distance between planes may be determined from the X-ray diffraction pattern. The interplanar distances calculated from the X-ray diffraction pattern have been determined for thousands of chemical compounds and minerals. These data have been indexed in a card file system "Data Cards for the Identification of Crystalline Materials" available from the American Society for Testing Materials. These cards contain the interplanar distance ("d") in angstrom units. Determinations have been made upon selected compositions as follows:

| Sample 1—<br>100% Ferric Oxide,<br>C. P. Grade | Sample 2—<br>97.5% Ferric Oxide,<br>2.5% Titanium<br>Dioxide | Sample 3—<br>66.6% Ferric Oxide,
33.4% Titanium
Dioxide |
|---|---|---|
| 2.69 | 2.635 | [1] 4.98 |
| 2.51 | 2.475 | [1] 3.24 |
| 2.21 | 2.16 | 2.76 |
| 1.84 | 1.813 | [1] 2.46 |
| 1.72 | 1.673 | 2.23 |
| 1.475 | 1.469 | 1.985 |
|  | 1.440 | 1.872 |
|  | 1.300 | 1.735 |
|  |  | [1] 1.655 |
|  |  | 1.552 |

[1] Lines of titanium dioxide.

The samples were fired in the same kiln and at the same time to 2300° F. on a 72 hour schedule. The spacings ("$d$") of the sample composed of 100% C. P. ferric oxide are identical with the ASTM card index for ferric oxide. It will be observed from the spacings of sample No. 2 that they are similar to those present in sample No. 1 with the exception that sample No. 2 has smaller lattice spacing, indicating a compression of the lattice. The conclusion is that the 2½% of titanium dioxide produces a compression of the ferric oxide lattice or lattice imperfection. Titanium dioxide plays the role of an impurity. Sample No. 3, containing a larger amount of titanium dioxide, shows an expansion of the lattice of ferric oxide. The spacings are compressed with 2½% titanium dioxide and larger amounts produce an expansion of the lattice.

The distortion of the ferric oxide lattice by the titanium dioxide occurs even if large amounts of other ceramic materials are employed. For example, a composition containing clay as well as ferric oxide and titanium dioxide was prepared and fired under the same conditions as the above samples.

| Sample 4— |
| --- |
| 50% Ferric Oxide, 10% Titanium Dioxide, 40% Ball Clay |
| 4.10 |
| 3.475 |
| ¹ 2.70 |
| ¹ 2.52 |
| ¹ 2.215 |
| 2.14 |
| ¹ 1.843 |
| 1.690 |
| 1.520 |
| 1.460 |

¹ Lines of ferric oxide.

By comparison with Example 1 it will be observed that the lattice spacings of the ferric oxide show a slight expansion.

As another example of distortion of the ferric oxide lattice, even though large amounts of other ceramic materials are present, the composition commercial glaze No. 1 of Tables 1 and 2 was prepared and fired in the same manner as Samples 1 to 4 above.

| Sample 5— |
| --- |
| 17.25% Ferric Oxide, 1.87% Titanium Dioxide, 80.88% Other Ceramic Materials Listed in Tables 1 and 2 |
| 4.17 |
| ¹ 2.74 |
| ¹ 2.56 |
| ¹ 1.71 |
| ¹ 1.49 |

¹ Lines of ferric oxide.

Although mixtures of substantially pure ferric oxide and titanium dioxide may be applied in the form of a slurry to the surface of porcelain insulator bodies and fired thereon to produce conducting coatings, by employing sufficient glass-forming materials and fluxes in admixture with the ferric oxide and titanium dioxide, coatings in accordance with the present invention, which are essentially glass-like, may be prepared having any desired resistance from a relatively low resistance to a realtively high resistance. Such conducting coatings on insulator bodies have utility for various purposes, the most important being the employment of the coatings as a glaze for portions of the surface of the insulators intended for high voltage alternating current power lines to prevent the production of radio interference. Such glazes when positioned upon an insulator so as to be in contact with the conductor, and preferably also with the supporting member for the insulator, reduces the potential gradient on the surface of the insulator and discharges causing radio interference are thereby prevented. In such applications a glaze will, of course, not cover the entire insulator body but will only be applied in the vicinity of the conducting or supporting member of the insulator. Glazes in accordance with the present invention may be prepared to have mechanical properties, surface gloss and moisture imperviousness equal to or better than the ordinary glazes conventionally employed for finishing the surfaces of insulators.

It is therefore an object of the present invention to provide an improved electrical conducting coating for insulator bodies.

Another object of the invention is to provide a conducting glaze for application to portions of electrical insulators which has mechanical properties similar to those of the usual insulating glazes but which has relatively low resistance as compared to such insulating glazes.

Another object of the invention is to provide an electrical conducting glaze composition having substantially the same characteristics and appearance as the usual non-conducting glazes with respect to gloss, mechanical strength and resistance to abrasion and rupture.

Another object of the invention is to provide an improved insulator for high voltage applications having a portion coated with a siliceous insulating glaze and a portion coated with a siliceous conducting glaze.

A further object of the invention is to provide a process of making a ceramic conducting material having glass-like properties and suitable for coating insulating bodies.

A still further object of the invention is to provide a process of making insulators for high voltage application in which a portion of the surface is coated with a conducting glaze and another portion of the surface is coated with an insulating glaze.

Other objects and advantages of the invention will appear in the following description of preferred embodiments thereof given in connection with the attached drawings, in which:

Fig. 1 is a triaxial diagram showing compositions suitable for conducting coatings on insulating bodies;

Fig. 2 is a graph showing the variations of resistance with changes in proportions of titanium dioxide and ferric oxide of a fired coating on an insulating body; and Fig. 3 is a vertical section of an insulator showing how the conducting glaze of the present invention may be applied thereto.

Referring more particularly to the drawings, the triaxial diagram of Fig. 1 is concerned with a three-component mixture, i. e., (1) titanium dioxide, (2) ferric oxide, and (3) glass-forming ingredients. A major area in which compositions suitable for forming conductor coatings on insulator bodies is outlined thereon and is bounded by the lines $a$, $b$, $c$, $d$ and $e$. This area includes the compositions which are useful in producing conducting coatings upon ceramic insulating bodies. In general, the compositions in the lower portion of the major area referred to have less desirable mechanical properties than those in the upper portion of the area since they are made up largely of titanium dioxide and ferric oxide and are deficient in glass-forming materials. An area of intermediate size bounded by the lines a, b, c, d' and f has also been outlined on the triaxial diagram. This intermediate area is included in the major area above discussed and within this intermediate area are the compositions which have relatively good mechanical properties while at the same time having electrical conductivities suitable for conducting coatings on ceramic insulator bodies. A still smaller area bounded by the lines a, g, h and i is outlined upon the triaxial diagram and within this small area are found the compositions which have proved most satisfactory for producing conducting glazes upon high voltage insulators.

The range of proportions of materials corresponding to the major area above discussed is as follows:

|  | Per cent |
|---|---|
| Titanium dioxide | — 1 to 40 |
| Ferric oxide | —13 to 99 |
| Glass-forming materials | — 0 to 86 |

In addition it has been found that the percentage of titanium dioxide should not be greater than the percentage of ferric oxide plus 5%. The above limits completely define the major area outlined on the triaxial diagram. For example, when the ferric oxide or the ferric oxide plus the glass-forming materials is 60%, the titanium dioxide cannot be greater than 40% since the total amount of materials cannot be more than 100%. On the other hand, if the ferric oxide is 25%, the amount of titanium dioxide cannot be greater than 30% because of the requirement that the percentage of titanium dioxide cannot exceed the percentage of ferric oxide by more than 5%.

Similarly, the intermediate sized area, in which are found the glazes of high mechanical strength, is completely defined by the following limits:

|  | Per cent |
|---|---|
| Titanium dioxide | 1–25 |
| Ferric oxide | 13–30 |
| Glass-forming materials | 45–86 | where the percentage of titanium dioxide is not greater than the percentage of ferric oxide plus 5%.

Similarly, the smallest area in which the best commercial conducting glazes have been produced is completely defined by the following limits:

|  | Per cent |
|---|---|
| Titanium dioxide | 1– 5 |
| Ferric oxide | 15–20 |
| Glass-forming materials | 75–84 |

Although as stated above, mixtures of pure titanium dioxide and pure ferric oxide, i. e., mixtures along the zero clay axis of the triaxial diagram of Fig. 1, do not form glazes of as high mechanical strength when applied as a coating to the exposed surfaces of porcelain insulators and fired thereon as glazes containing substantial amounts of glass-forming materials, such mixtures do form glazes or conducting coatings useful for many purposes. They may be employed, for example, on insulators where the coating is not subjected to high mechanical stresses and may also be employed in the pin holes of insulators, and for resistance units not subject to mechanical wear. For example, rods or tubes of porcelain may have such mixtures applied in the form of a slurry and the resulting coating dried and then fired. For purposes of illustrating the change in surface resistivity with changes in proportions of titanium dioxide and ferric oxide, a curve in which surface resistivity is plotted against mixtures having varying ratios of titanium dioxide and ferric oxide is plotted in Fig. 2. The curve therein shown was obtained from applying various mixtures of titanium dioxide and ferric oxide to an unfired porcelain body to produce a film between .008 and .010 inches thick and then firing the porcelain body at 2340° F. The porcelain body had the following composition:

|  | Per cent |
|---|---|
| Flint | 15 |
| Feldspar | 45 |
| China clay | 35 |
| Ball clay | 6 |

This composition vitrified at a temperature of 2340° F. A sample of the uncoated body after firing had a surface resistivity of 60,000 megohms per centimeter square. The composition of the body of the insulator is given merely by way of example as any suitable type of ceramic insulator body may be employed. For example, the flint may vary from 15% to 25%, the feldspar may vary from 25% to 45%, the China clay may vary from 15% to 35% and the ball clay may vary from 6% to 35%. Also, other ceramic materials may be included or substituted, if desired.

It will be noted that the resistance of the titanium dioxide and ferric oxide coating reached a minimum in the neighborhood of 2% to 3% titanium dioxide and that the resistance increased rather rapidly when the proportion of titanium dioxide to ferric oxide was changed. The surface resistivities of titanium dioxide when applied alone, or of ferric oxide when applied alone, were much higher than any surface resistivity shown in Fig. 2.

Various glass-forming materials are desirably added to the mixtures of ferric oxide and titanium dioxide to produce a glass-like structure. Even a small amount of glass-forming materials improves the physical characteristics of the conducting coating but the best glazes are formed with relatively large amounts of glass-forming materials, particularly silica. There is apparently an interaction between the insulator body and the conducting coating material with conducting compositions which in the form in which they are applied contain no glass-forming materials or small amounts only. That is to say, compositions containing very little glass-forming materials and having a relatively low specific resistivity (ohms per centimeter cube when fired as solid bodies) develop relatively high surface resistivities when applied as coatings to insulator bodies and fired. Also, there is limit to how high the titanium dioxide-ferric oxide ratio can be increased for coating compositions having relatively small amounts of glass-forming materials. A ratio of 40% titanium dioxide to 60% ferric oxide is approximately the upper limit for pure titanium dioxide-ferric oxide compositions in order to produce useful values of conductance. This ratio can be increased as glass-forming materials are added up to a ratio of approximately 40% titanium dioxide to 35% ferric oxide but this ratio again decreases when large amounts of glass-forming materials are added, i. e., in the upper portion of the major area outlined on the triaxial diagram of Fig. 1. As the amounts of glass-forming materials in the coating compositions are increased the interaction with the ceramic insulator body during firing apparently decreases since the surface resistivity of the fired coating is more nearly proportional to the specific resistivity of the coating material when fired by itself to form a solid conducting body.

In general, the best glaze composition is high in total silica content as this gives the best surface characteristics and increased mechanical strength. Thus, glaze compositions ranging from approximately 30% to 66% total silica content may be employed. In such glazes, the titanium dioxide content will range from approximately 1% to 25% and the ferric oxide content will range from approximately 15% to 30%. Such glazes should preferably be low in fluxes such as alkali metals, alkaline earth metal compounds, zinc oxide, etc., but in general, a small amount of such fluxes is necessary to provide a firing temperature of approximately that of the porcelain body of the insulator. The total amount of such fluxes will ordinarily range from approximately 5% to 20%. A greater fusibility at a given temperature with the minimum amount of total flux, i. e., basic oxides, is usually obtained by a mixture of several of such oxides.

The firing temperature of glazes or conducting coatings for high voltage insulators in accordance with the present invention will usually range from approximately 2237° F. to 2462° F., i. e., they will ordinarily be fired above pyrometric cone 8 and not over 13. That is to say, they preferably have firing temperatures substantially the same as the porcelain bodies to which they are applied so that the body of the insulator and a conducting coating applied thereto can be fired in a single operation. However, by modifying the composition of the glaze coating as discussed above, conducting coatings having any desired firing temperatures within a wide range can be produced, for example, firing temperatures ranging from approximately 1500° F. to 2500° F. By employing coatings having a lower firing temperature than the ceramic body to which they are applied, the coatings can be applied to a previously fired body and the coated body again fired at a lower temperature. The correct firing temperature for any given glaze or coating composition is that which will cause vitrification of the composition without being sufficiently high to cause substantial devitrification during the time the composition is subjected to the firing temperature. That is to say, short firing schedules require somewhat higher temperatures than long firing schedules, the best products usually resulting from as long a firing schedule as is commercially feasible with a corresponding lower temperature.

For glazes having high mechanical strength, the total glass-forming materials will range from approximately 45% to 86%. For commercial glazes, a ratio of titanium dioxide to ferric oxide of approximately 1:15 to 1:4 has been found satisfactory although good glazes can be produced with a ratio as high as approximately 2:1. Using the optimum ratios of titanium dioxide to ferric oxide, i. e., a ratio in the range of 1:15 to 1:4, and a glaze base having a high silica content and low flux content, glazes having a surface resistivity ranging from 3 to 5 megohms may be secured by employing approximately 15% to 20% total titanium dioxide and ferric oxide. The surface resistivity goes up rapidly with increased dilution with glass-forming constituents after the total amount of active oxides has been reduced below approximately 15%.

The following table illustrates several compositions suitable for commercial insulator glazes:

Table 1

|  | 1 | 2 | 3 |
|---|---|---|---|
| Titanium dioxide, per cent | 1.87 | 1.84 | 1.89 |
| Ferric oxide | 17.25 | 16.50 | 16.96 |
| Whiting, per cent | 8.45 | 12.13 | 10.05 |
| Feldspar, per cent | 23.65 | 23.48 | 20.59 |
| Silica, per cent | 36.65 | 36.67 | 37.59 |
| Ball clay, per cent | 8.33 | 8.62 | 11.32 |
| Dolomite, per cent | 1.25 | | |
| Albany slip clay, per cent | 2.50 | | |
| Manganese dioxide, per cent | .25 | | |
| Chromic oxide, per cent | .12 | | |
| Zinc oxide, per cent | | .72 | 1.29 |
| Surface Resistivity Megohms | 2.0 | 2.5 | 3.0 |

When the glazes of the above table are calculated to the oxides after firing, taking into consideration loss of water of crystallization, loss of carbon dioxide from the carbonates, etc., the following compositions result:

Table 2

|  | 1 | 2 | 3 |
|---|---|---|---|
| $TiO_2$ | 2.03 | 1.98 | 2.03 |
| $Fe_2O_3$ | 18.83 | 17.73 | 18.20 |
| $CaO$ | 5.31 | 7.31 | 6.10 |
| $Al_2O_3$ | 5.72 | 6.99 | 7.39 |
| $K_2O$ | 2.49 | 2.38 | 2.12 |
| $Na_2O$ | .90 | .88 | .77 |
| $SiO_2$ | 63.94 | 61.97 | 62.01 |
| $MgO$ | .38 | | |
| $MnO_2$ | .27 | | |
| $Cr_2O_3$ | .13 | | |
| $ZnO$ | | .76 | 1.38 |

It is noted that glaze No. 1 contains a small amount of heavy metal oxides, namely chromium oxide and manganese oxide. Such heavy metal oxides when employed in small amounts do not materially affect the surface resistivity of the glaze although the amount of such other heavy metal oxides should not, in general, exceed the amount of titanium dioxide employed and in any case, should not exceed more than approximately 50% of the ferric oxide.

As examples of other glaze compositions, the following table is given:

Table 3

| | Titanium Dioxide, Percent | Ferric Oxide, Percent | Whiting, Percent | Feldspar, Percent | Silica, Percent | Ball Clay, Percent | Surface Resistivity, Megohms |
|---|---|---|---|---|---|---|---|
| 1 | 2.50 | 22.50 | 11.47 | 27.47 | 27.59 | 8.47 | 4.0 |
| 2 | 2.50 | 22.50 | 20.00 | | 47.50 | 8.50 | 4.50 |
| 3 | 2.50 | 22.50 | 8.60 | 20.50 | 39.40 | 6.50 | 1.7 |
| 4 | 4.16 | 20.80 | 11.48 | 27.39 | 27.64 | 8.49 | 35.0 |
| 5 | 11.79 | 14.40 | 16.14 | 25.05 | 21.91 | 10.71 | 2,500.00 |
| 6 | 11.25 | 13.75 | 11.47 | 27.47 | 27.59 | 8.47 | 55.0 |
| 7 | 15.89 | 19.43 | 9.29 | 22.94 | 22.21 | 10.24 | 50.0 |
| 8 | 17.40 | 26.00 | 13.10 | 17.40 | 17.40 | 8.70 | 50.0 |
| 9 | 22.40 | 24.90 | 11.80 | 14.30 | 18.90 | 7.70 | 15.0 |
| 10 | 21.70 | 26.50 | 14.40 | 9.60 | 19.30 | 8.5 | 4.0 |
| 11 | 3.00 | 14.60 | 12.60 | 30.10 | 30.30 | 9.4 | 50.0 |

When the compositions of the above glazes are calculated to the oxides after firing, the following compositions result:

*Table 4*

| No. | TiO₂, Percent | Fe₂O₃, Percent | CaO, Percent | Al₂O₃, Percent | K₂O, Percent | Na₂O, Percent | SiO₂, Percent | Surface Resistivity, Megohms |
|---|---|---|---|---|---|---|---|---|
| 1 | 2.58 | 24.12 | 6.92 | 7.62 | 2.76 | 1.05 | 54.95 | 4.0 |
| 2 | 2.75 | 24.80 | 12.40 | 2.94 | | | 57.00 | 4.50 |
| 3 | 2.64 | 23.71 | 5.08 | 5.65 | 2.02 | .75 | 60.15 | 1.7 |
| 4 | 4.36 | 22.35 | 6.91 | 7.61 | 2.75 | 1.02 | 55.00 | 35.0 |
| 5 | 12.98 | 15.84 | 9.95 | 8.17 | 2.62 | .96 | 49.48 | 2,500.0 |
| 6 | 12.05 | 14.72 | 6.89 | 7.61 | 2.75 | 1.03 | 54.95 | 55.0 |
| 7 | 16.91 | 20.70 | 5.55 | 7.38 | 2.32 | .84 | 46.30 | 50.0 |
| 8 | 17.40 | 26.07 | 7.92 | 6.00 | 1.80 | .66 | 36.75 | 50.0 |
| 9 | 24.00 | 26.66 | 7.10 | 5.06 | 1.48 | .53 | 35.17 | 15.0 |
| 10 | 23.58 | 28.78 | 8.76 | 4.59 | 1.05 | .36 | 32.88 | 4.0 |
| 11 | 3.26 | 15.21 | 7.70 | 8.52 | 3.07 | 1.14 | 61.10 | 50.00 |

The compositions of this table all fall within the intermediate area outlined on the triaxial diagram, i. e., the area bounded by the lines $a$, $b$, $c$, $d'$ and $f$.

The actual ranges of oxides of the above tables are as follows:

| | |
|---|---|
| Titanium dioxide | 1.98–24.00 |
| Ferric oxide | 14.72–28.78 |
| Calcium oxide | 5.08–12.40 |
| Alumina | 2.92– 8.52 |
| Potassium oxide | 0– 3.07 |
| Sodium oxide | 0– 1.14 |
| Silica | 32.88–63.94 |

By adding larger amounts of low temperature melting point compounds such as lead oxide, boric oxide, etc., glazes which may be fired as low as 1500° F. may be produced. Thus low temperature glazes having a fired oxide content within the following ranges have been produced:

| | |
|---|---|
| Titanium dioxide | 2.00–24.00 |
| Ferric oxide | 14.72–50.00 |
| Calcium oxide | 2.74–22.28 |
| Alumina | 2.08–26.70 |
| Lead oxide (PbO) | 0–41.80 |
| Boric oxide | 4.92–41.80 |
| Potassium oxide | 0–15.35 |
| Sodium oxide | 1.07–10.70 |
| Silica | 10.80–59.90 |

It will be noted that the composition of all of these glazes as well as those of the glazes previously discussed fall within the major area outlined on the triaxial diagram. The glazes of all of the tables above given all contain at least 20% glass-forming materials and thus fall on the triaxial diagram in approximately the upper three-fourths of the major area outlined thereon. If the mechanical properties of the conducting coatings are not of importance, however, compositions below the 20% glass-forming materials line on the triaxial diagram and within the major area outlined thereon may be employed for various purposes.

As stated above, one of the most important applications of the composition of the present invention is to form a conducting glaze upon insulators for high tension electrical circuits. The insulator selected for illustration in Fig. 3 is of the pin type and includes two or more porcelain shells 10 and 12 having nested sections 14 and 16 secured together by a suitable cement 18. The head of the shell 10 may be provided with the usual transverse groove 20 for a conductor and an annular groove 22 for the reception of a tie wire. The lower portion 12 is provided with a pin hole 24 for receiving a supporting pin (not shown). A coating 26 of conducting glaze in accordance with the present invention may be applied over the grooves 20 and 22 on the head of the shell 10 and a similar coating 28 may be applied over the inner surface of the pin hole 24 of the shell 12. Another coating 25 in the form of an annular band adjacent the nested portion of the shell 12 may also be provided. The remainder of the surfaces of the shells 10 and 12 may be covered with the usual non-conducting glaze as indicated by the reference numeral 30.

The conducting glaze may be applied to the dry unfired porcelain shells 10 and 12 in the form of a slurry by dipping or spraying. A mask such as a paraffin coating may be employed for the portions of the insulator not desired to be coated when applying one of the glazes. In many cases, such masks are not needed as the upper portion, for example, of the shell 10 can be coated with conduction glaze by dipping this portion only, the dipped portion allowed to dry, and then the lower portion coated with insulating glaze by dipping. Similarly, the insulator hole in the section 12 can be first coated by pouring a slurry of conducting glaze thereinto and employing the same to leave a layer which is then allowed to dry. The hole may then be corked and the insulator dipped into a slurry of insulating glaze composition. If the band of conducting glaze 25 on the lower shell is desired this can be applied by spraying, then the pin hole coated with conducting glaze, the shell allowed to dry and the pin hole corked. Then by first dipping the upper portion of the shell and then the lower portion of the shell the insulating glaze can be applied. Selective coating of different portions of the insulator with different glazes can also be obtained by suspending one of the glazes in a wax emulsion such as paraffin. For example, the conducting glaze can be suspended in a paraffin emulsion and portions of the insulator dipped therein to produce a coating. When this coating has dried, the entire insulator may be dipped into a slurry of the non-conducting glaze which will adhere to the portions only of the insulator not having the previous coating. The coated insulator is then fired in a manner well known to the art to provide thereon a homogeneous glossy abrasion and corrosion resisting coating and to produce an insulator of greater strength than the porcelain body thereof and capable of reducing radio interference.

It is many times advantageous to lap the non-conducting glaze over the conducting glaze, for example, as shown at 27 and 29. This prevents thin edges of the conducting glaze being exposed. The generally accepted theory of the action of the conducting coating in reducing radio interference is that the conducting glaze in contact with the conductor or the pin makes relatively good contact therewith and spreads the contact between the insulating body of the insulator and the conductor over a relatively wide area thus preventing the charging current for the insulator body from being concentrated at one or more points resulting in a discharge which produces radio frequency radiation. It will be apparent that the glaze of the present invention may be applied to various types of insulators, not only the several types of insulators employed for high tension power lines but also to any type of insulator employed for high voltage.

The conductivity of the conducting glaze may vary within relatively wide limits and still prevent radio interference. The resistance of the conducting glaze must, however, not be too low, otherwise a discharge at the edge of the glaze remote from the conductor or supporting structure for the insulator may take place and for this reason highly conductive metallic or other coatings are not satisfactory. For purposes of insulator glazes it is more convenient to deal with so-called "surface resistivity" than specific resistance. Such surface resistivity may be defined as the resistance of the layer of glaze per centimeter square, that is, the resistance of a path one centimeter wide and one centimeter long between conducting members such as foil pressed against the surface of glaze. The layer of glaze will ordinarily vary between .008 and .015 inch, but there is apparently some reaction between the siliceous material of the insulator bodies and the glaze resulting in a non-uniform composition throughout the layer of the glaze and as the volume resistivity of the insulator affects the measured resistance the surface resistivity is not directly comparable to specific resistivity by calculation of the specific resistivity from the surface resistivity and the thickness of the layer. However, the conducting properties of the glaze extend a substantial distance below the surface of the glaze, as in contrast to previously suggested conducting coatings which are readily easily rubbed off, a substantial portion of the glaze may be removed, for example by sand-blasting off one-half the thickness thereof, without destroying the radio interference preventing properties if a reasonably high conducting glaze is employed.

For practical purposes the lower limit of surface resistivity for prevention of radio interference appears to be approximately ¼ megohm per centimeter square although it is possible to satisfactorily use glazes as low as $\frac{1}{16}$ megohm per centimeter square if the glaze is properly applied to abut the edge of the glaze against the porcelain of the insulator or the non-conducting glaze. Surface resistivities much lower than those mentioned allow discharges to take place at the edges of the glaze remote from the conductor or supporting structure for the insulator and still cause interference. On the other hand, too high a surface resistivity causes the glaze to act like an insulating material so that radio interference takes place in the same manner as with ordinary insulators. For practical purposes the upper limit of surface resistivity is approximately 50 megohms per centimeter square although in some cases a resistivity of approximately 100 megohms per centimeter square has been found operative. The preferred range of surface resistivity is about 1 to 5 megohms per centimeter square.

It is preferred to produce the glazes of the present invention by merely mixing materials in rather finely divided form, grinding the same in a ball or pebble mill to form a relatively thick slurry and then dipping the insulators to be glazed directly in the slurry. It is apparent, however, that various modifications of this process can be carried on, for example, the glaze composition may be ground, fired, and then reground and applied to the insulator by dipping in a slurry thereof; a glass composition can be first fired, then ground and the heavy metal oxides added to this frit, or the mixture of heavy metal oxides may first be independently fired and then ground and mixed with the glass-forming materials to form the glaze to be applied to the insulator.

For high resistance resistor elements it is also possible to coat a rod or tube of fired or unfired porcelain or other ceramic base with a slurry of conducting glaze produced in a manner similar to that employed for coating insulators, then dry the glaze and fire the coated body. Coating with the glaze may be carried on either before or after the insulating rod or tube has been divided into suitable lengths.

Various methods may be employed for insuring effective connection between the ends of the resistor units and resistor leads. For resistor elements having a low enough resistance to carry an electroplating current, conducting metals such as copper, nickel, tin, chromium, cadmium, etc., may be electrically plated upon the ends of the resistor unit. For all resistors including high resistance units metal may be sprayed upon the ends of the resistor units by any of the metal spraying processes known to the art. Another method particularly useful for precision resistors is to coat the ends of the resistor elements with ceramic liquid gold, platinum or other noble metal such as is used to decorate dishes. This material may be painted on the ends of the resistors or the resistors dipped thereinto and allowed to dry. By heating to approximately 1500° F., in the case of platinum, the platinum is reduced to metallic form and may then, if desired, be coated or plated with a conducting metal such as copper or silver. Resistor leads may then be soldered or clamped against the conducting metal on the ends of the resistor units and if desired, the entire resistor unit including the ends of the leads adjacent the resistance material may be imbedded in insulating material such as thermoplastic or thermo-setting synthetic resins, for example, Bakelite. If the leads and conducting metals on the end of the resistors have a sufficiently high melting point the entire resistor element including the ends of the leads adjacent the resistor may be dipped in a low melting point non-conducting glaze and again fired to provide resistors completely encased with glass or glasslike insulating.

This application is a continuation-in-part of my copending application, Serial No. 408,400, filed August 26, 1941, which in turn is a continuation-in-part of my application Serial No. 328,322, filed April 6, 1940, both of said copending applications now being abandoned.

I claim:

1. An electrical insulator comprising, in combination, a ceramic body and an applied coating of semi-conducting material upon predetermined portions of the ceramic body, the semi-conducting coating composed of from 1% to 40% by weight of titanium dioxide and from 60% to 99% by weight of iron oxide and the applied coating being fired at temperatures above pyrometric cone 8 and not over cone 13.

2. A semi-conducting composition for application to porcelain insulating bodies to reduce radio interference consisting of 1% to 40% by weight of titanium dioxide and from 99% to 60% by weight of ferric oxide, the composition when applied and fired forming a semi-conducting, adherent coating on porcelain.

3. An electrical insulator comprising, in combination, a ceramic body and an applied coating of semi-conducting material upon predetermined portions of the ceramic body, the semi-conducting coating being composed of from 1 to 40% of titanium dioxide, from 13 to 99% by weight of ferric oxide and from 0 to 86% by weight of other ceramic oxides having a state of oxidation equivalent to ferric oxide and titanium dioxide, the percentage of titanium dioxide not being greater than the percentage of ferric oxide plus 5%, the percentage of heavy metal oxides other than ferric oxide and titanium dioxide not being greater than the percentage of titanium dioxide, and the applied coating being fired at a vitrifying temperature between 1500° and 2500° F.

4. An electrical insulator comprising, in combination, a ceramic body and a vitrified, fired coating of semi-conducting ceramic material upon predetermined portions of the ceramic body, the semi-conducting coating being composed of from 1 to 40% titanium dioxide by weight, 13 to 99% of ferric oxide by weight and from 0 to 86% by weight of other ceramic oxides including glass-forming materials, said other ceramic oxides having a state of oxidation equivalent to that of ferric oxide and titanium dioxide, the percentage of titanium dioxide not being greater than the percentage of ferric oxide plus 5%, and the percentage of heavy metal oxides other than ferric oxide and titanium dioxide not being greater than the percentage of titanium dioxide.

5. An electrical insulator comprising, in combination, a ceramic body and a vitrified, fired coating of semi-conducting ceramic material upon predetermined portions of the ceramic body, the semi-conducting coating being composed of from 1 to 25% titanium dioxide by weight, 13 to 30% of ferric oxide by weight and from 45 to 86% by weight of other ceramic oxides including glass-forming materials, said other ceramic oxides having a state of oxidation equivalent to that of ferric oxide and titanium dioxide, the percentage of titanium dioxide not being greater than the percentage of ferric oxide plus 5%.

6. An electrical insulator comprising, in combination, a ceramic body and a vitrified, fired coating of semi-conducting ceramic material upon predetermined portions of the ceramic body, the semi-conducting coating being composed of from 1 to 5% titanium dioxide by weight, 15 to 20% of ferric oxide by weight and from 75 to 84% by weight of other ceramic oxides including glass-forming materials, said other ceramic oxides having a state of oxidation equivalent to that of ferric oxide and titanium dioxide.

7. A semi-conducting coating composition for application to and firing on ceramic insulating bodies, said composition consisting of at least one titanium compound producing from 1 to 40% titanium dioxide in the fired coating, at least one iron compound producing from 13 to 99% ferric oxide in the fired coating, and other ceramic materials producing from 0 to 86% ceramic oxides having a state of oxidation equivalent to ferric oxide and titanium dioxide in the fired coating, the amount of titanium compound producing a percentage of titanium dioxide not greater than the percentage of ferric oxide plus 5%, and the amount of any heavy metal compounds other than said titanium and iron compounds producing a percentage of heavy metal oxides not greater than the percentage of titanium dioxide, said composition when applied and fired forming a semi-conducting, adherent coating.

8. A semi-conducting coating composition for application to and firing on ceramic insulating bodies, said composition consisting of at least one titanium compound producing from 1 to 25% titanium dioxide in the fired coating, at least one iron compound producing from 13 to 30% ferric oxide in the fired coating, and other ceramic materials producing from 45 to 86% ceramic oxides having a state of oxidation equivalent to ferric oxide and titanium dioxide in the fired coating, the amount of titanium compound producing a percentage of titanium dioxide not greater than the percentage of ferric oxide plus 5%, said composition when applied and fired forming a semi-conducting, adherent coating.

9. A semi-conducting coating composition for application to and firing on ceramic insulating bodies, said composition consisting of at least one titanium compound producing from 1 to 5% titanium dioxide in the fired coating, at least the iron compound producing from 13 to 30% ferric oxide in the fired coating, and other ceramic materials producing from 75 to 84% ceramic oxides having a state of oxidation equivalent to ferric oxide and titanium dioxide in the fired coating, said composition when applied and fired forming a semi-conducting, adherent coating.

10. The method of making electrical insulators having semi-conducting coatings of fired vitrified ceramic material on selected portions thereof, which comprises, applying to said portions a coating of a composition consisting of at least one titanium compound producing from 1 to 40% titanium dioxide in the fired coating, at least one iron compound producing from 13 to 99% ferric oxide in the fired coating, and other ceramic materials producing from 0 to 85% ceramic oxides having a state of oxidation equivalent to ferric oxide and titanium dioxide in the fired coating, the amount of titanium compound producing a percentage of titanium dioxide not greater than the percentage of ferric oxide plus 5%, the amount of any heavy metal compounds other than said titanium and iron compounds producing a percentage of heavy metal oxides not greater than the percentage of titanium dioxide, and firing the applied coating in an oxidizing atmosphere at a vitrifying temperature for said composition for sufficient time to vitrify said composition and produce a fired coating in which the oxides have a state of oxidation equivalent to that of titanium dioxide and ferric oxide.

11. The method of making electrical insulators having semi-conducting coatings of fired vitrified ceramic material on selected portions thereof, which comprises, applying to said portions a coating of a composition consisting of at least one titanium compound producing from 1 to 25% titanium dioxide in the fired coating, at least one iron compound producing from 13 to 30% ferric oxide in the fired coating, and other ceramic materials producing from 45 to 86% ceramic oxides having a state of oxidation equivalent to ferric oxide and titanium dioxide in the fired coating, the amount of titanium compound producing a percentage of titanium dioxide not greater than the percentage of ferric oxide plus 5%, and firing the applied coating in an oxidizing atmosphere at a vitrifying temperature for said composition for sufficient time to vitrify said composition and produce a fired coating in which the oxides have a state of oxidation equivalent to that of titanium dioxide and ferric oxide.

12. The method of making electrical insulators having semi-conducting coatings of fired vitrified ceramic material on selected portions thereof, which comprises, applying to said portions a coating of a composition consisting of at least one titanium compound producing from 1 to 5% titanium dioxide in the fired coating, at least one iron compound producing from 13 to 30% ferric oxide in the fired coating, and other ceramic materials producing from 75 to 84% ceramic oxides having a state of oxidation equivalent to ferric oxide and titanium dioxide in the fired coating, and firing the applied coating in an oxidizing atmosphere at a vitrifying temperature for said composition for sufficient time to vitrify said composition and produce a fired coating in which the oxides have a state of oxidation equivalent to that of titanium dioxide and ferric oxide.

13. The method of making electrical insulators having semi-conducting coatings of fired vitrified ceramic material on selected portions thereof, which comprises applying to said portions a coating of a composition consisting of 1 to 40% titanium dioxide and 60 to 99% ferric oxide, and firing the applied coating in an oxidizing atmosphere at a vitrifying temperature for said composition for sufficient time to vitrify said composition.

PAUL H. SANBORN.

REFERENCES CITED

The following references are of record in the file of this patent:

FOREIGN PATENTS

| Number | Country | Date |
|---|---|---|
| 552,783 | France | 1923 |
| 586,064 | Great Britain | 1947 |